(12) United States Patent
Carawan et al.

(10) Patent No.: US 6,746,199 B2
(45) Date of Patent: Jun. 8, 2004

(54) ADJUSTABLE SYSTEM AND METHOD FOR FACILITATING HANDLING OF CARGO

(76) Inventors: Paul Jennings Carawan, 111 Red Oak Ct., Gastonia, NC (US) 28052; Michael D. Adams, P.O. Box 173, Bessemer City, NC (US) 28016; Brian W. Merriman, 102 Fern Ct., Winchester, VA (US) 22602

(*) Notice: Subject to any disclaimer, the term of this patent is extended or adjusted under 35 U.S.C. 154(b) by 0 days.

(21) Appl. No.: 10/272,607

(22) Filed: Oct. 16, 2002

(65) Prior Publication Data

US 2003/0082036 A1 May 1, 2003

Related U.S. Application Data

(60) Provisional application No. 60/330,047, filed on Oct. 16, 2001.

(51) Int. Cl.[7] ................................................. B60P 1/00
(52) U.S. Cl. ...................... 414/535; 414/507; 414/527; 414/537; 296/39.1; 296/41
(58) Field of Search ................................. 414/507, 527, 414/535, 537; 296/39.1, 39.2, 41

(56) References Cited

U.S. PATENT DOCUMENTS

| | | | |
|---|---|---|---|
| 1,647,665 A | | 11/1927 | Riche |
| 2,392,789 A | | 1/1946 | Watter |
| 2,428,144 A | * | 9/1947 | Clough .................. 414/542 |
| 2,693,286 A | * | 11/1954 | Cocks .................... 414/535 |
| 3,446,326 A | | 5/1969 | Sandefur |
| 3,578,375 A | | 5/1971 | Finefrock |
| 3,881,768 A | | 5/1975 | Nix |
| 4,684,311 A | * | 8/1987 | Dickson-Wright et al. .. 414/535 |
| 4,823,927 A | | 4/1989 | Jensen |
| 4,967,894 A | | 11/1990 | Thunnissen |
| 5,026,228 A | | 6/1991 | Mansfield |
| 5,102,286 A | | 4/1992 | Fenton |
| 5,165,747 A | * | 11/1992 | Stringer et al. ............. 296/41 |
| 5,395,204 A | | 3/1995 | Balik |
| 5,429,383 A | | 7/1995 | Reed |
| 5,722,711 A | | 3/1998 | German |
| 5,941,672 A | | 8/1999 | Lapointe et al. |
| 6,193,043 B1 | | 2/2001 | Langston et al. |

OTHER PUBLICATIONS

Ancra International LLC Material Handling Systems, Introducing the next generation in material handling systems, sales brochure, 6 pages.

Ancra International LLC Material Handling Systems, Introducing a remarkable way to maximize your trailer's capacity, sales brochure, 6 pages.

Website of Gagne, Inc. at http://www.gagneinc.com; 5 pages dated Oct. 16, 2002.

* cited by examiner

Primary Examiner—Steven A. Bratlie
(74) Attorney, Agent, or Firm—Alston & Bird LLP (57) ABSTRACT

An adjustable system and an associated method for handling cargo in a cargo carrier are provided. The system includes a plurality of strips of low friction material for supporting the cargo during unloading or loading and during transit. Each strip has a relatively lower coefficient of friction than a floor of the cargo carrier and can be adjusted between an operative position and a non-operative position. In the operative position, the strips extend from the floor of the cargo carrier so that the cargo can be slid upon and supported by the strips. In the non-operative position, the strips are adjusted relative to the floor so that cargo in the carrier is at least partially supported by the floor.

28 Claims, 7 Drawing Sheets

ADJUSTABLE SYSTEM AND METHOD FOR FACILITATING HANDLING OF CARGO

CROSS-REFERENCE TO RELATED APPLICATION

This application claims the benefit of U.S. Provisional Application No. 60/330,047, filed Oct. 16, 2001.

BACKGROUND OF THE INVENTION

1) Field of the Invention

The present invention relates to cargo handling and, more specifically, to an adjustable system and associated method for facilitating the handling of cargo in a cargo carrier.

2) Description of Related Art

Existing trailers of transfer trucks that are sometimes used with cargo delivered to airport cargo handling terminals typically have floors fitted with roller systems for supporting pallets of cargo for easy movement in and out of the trailer. One such prior system is the Retract-A-Roll® system supplied by Ancra International, Inc. of Erlanger, Ky. These rollers systems are also used in aircraft. However, their use in truck trailers presents many problems. Truck trailers are dirty and are subject to rough use, thus, subjecting the roller systems to wear and damage. Also the roller systems are heavy, for example, sometimes adding up to 1,800 pounds or more of weight per trailer. Thus, the inclusion of a roller system in a trailer reduces the amount of freight or cargo that may be carried. This is particularly undesirable when the trailer is used to carry cargo not intended for delivery to an airline. The roller systems are also expensive. However, truckers who wish to deliver goods to air cargo services are often required to use trailers having these roller systems.

Thus, there exists a need for a cargo handling system that facilitates the movement of cargo into and out of a cargo carrier. The cargo handling system should be suited for use in harsh conditions, such as in truck trailers. Additionally, the system should not be unnecessarily heavy or costly to install or maintain.

BRIEF SUMMARY OF THE INVENTION

The present invention provides an adjustable system and an associated method for handling cargo in a cargo carrier. Adjustable low friction strips facilitate loading, unloading, and transit of the cargo. The strips are lightweight in comparison to conventional roller systems, and perform well in dirty or rough conditions. The strips can easily be replaced if worn. Further, the strips can be selectively adjusted between operative and non-operative positions.

In one embodiment of the invention, the system includes a plurality of the strips extending longitudinally from a loading aperture of the cargo carrier. Each strip has a relatively lower coefficient of friction than a floor of the carrier. In the operative position, each strip extends from the floor of the cargo carrier so that the cargo can be slid upon and supported by the strips. In the non-operative position, the strips are adjusted relative to the floor so that the cargo is at least partially supported by the floor. According to one aspect of the invention, the strips are rotatably adjustable between the operative and non-operative positions. For example, each strip can be rotatably supported by a hinge and configured to rotate from a position in which the strip extends from the floor to a position in which the strip is disposed in a groove in the floor. The strips can be hinged individually or can be mounted on a frame that can be rotated from the floor about 90 degrees. According to another aspect, the floor defines a plurality of grooves for receiving the strips, and each strip is slidably adjustable relative to the floor from the operative position, in which the strips extend above the floor, to the non-operative position, in which the strips are retracted into the grooves. Each strip can be supported by a respective groove so that slidably adjusting the strip longitudinally adjusts the strip in a transverse direction perpendicular to the floor between the operative and non-operative positions. The strips and/or the respective grooves define guides that include at least one ramped portion and at least one flat portion for the range of motion of the strips. For example, each strip can define a plurality of ramped surfaces that engage correspondingly ramped surfaces of the floor. Alternatively, protrusions and corresponding notches can be provided on the strips and sidewalls of the grooves so that the strips slidably engage the sidewalls by the notches, which are ramp shaped and receive the protrusions so that longitudinal adjustment of each strip correspondingly extends and retracts the strip relative to the floor. According to yet another aspect, a bladder can be provided in the grooves under the strip and configured to be inflated and deflated with a fluid so that the strip can be extended or retracted relative to the floor. In each embodiment, a linkage can connect the strips so that they move in unison between the operative and non-operative positions. Additionally, each strip can include a replaceable low friction portion that is releasably connected to a structural portion of the strip.

The present invention also provides a method of handling cargo in a cargo carrier. The method includes providing the low friction strips of material for supporting the cargo during unloading or loading and during transit, the strips having a relatively lower coefficient of friction than a floor of the cargo carrier. The strips are selectively adjusted between the operative and a non-operative positions. According to one aspect, the strips are adjusted by rotating, for example, by adjusting a linkage that connects the strips and rotating the strips at least about 180 degrees about an axis parallel to the floor. Alternatively, the strips can be connected by a frame that is rotated about 90 degrees about an axis parallel to the floor. According to another aspect of the invention, the strips are adjusted by sliding the strips relative to the floor in a longitudinal direction between the operative position, in which the strips extend above the floor, and the non-operative position, in which the strips are retracted into the grooves. Alternatively, the strips can be adjusted by selectively inflating and deflating a plurality of bladders with fluid. The bladders are disposed in grooves and support the strips so that inflating the bladders extends the strips from the grooves and to the operative position and deflating the bladders retracts the strips into the grooves and to the non-operative position.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
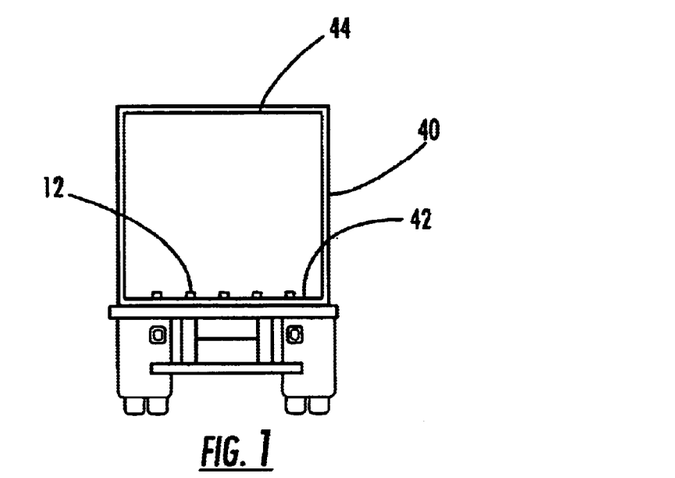
FIG. 1 is an elevation view of a cargo carrier including an adjustable system for handling cargo according to one embodiment of the present invention.
Figure 2:
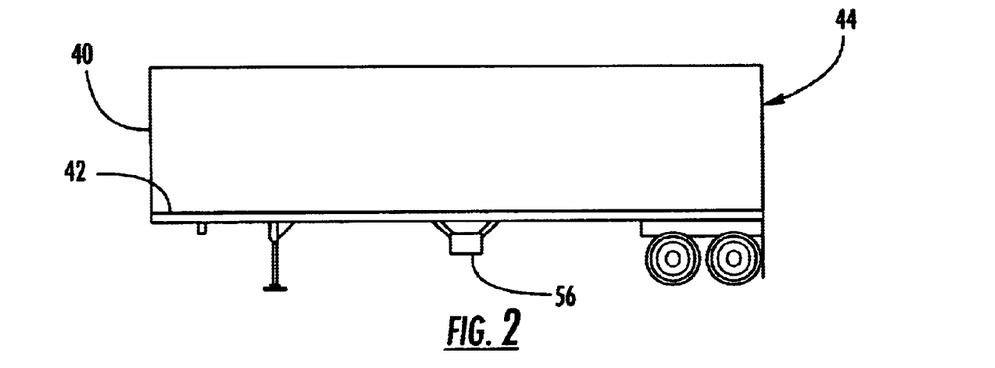
FIG. 2 is a side view of the cargo carrier of FIG. 1.
Figure 3:
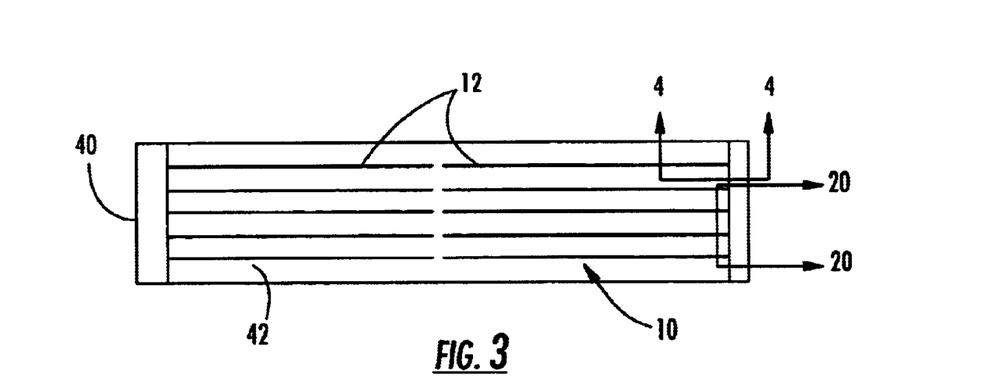
FIG. 3 is a plan view of the inside of the cargo carrier of FIG. 1.

As shown in FIGS. 1–3, the present invention according to one embodiment provides an adjustable cargo handling system 10 that includes a plurality of strips 12 or rails disposed on a floor 42 of a cargo carrier 40. For example, the cargo carrier 40 can be a truck, trailer, other vehicle such as an airplane or ship, or a cargo container. The strips can be disposed along the floor 42 to provide an easy sliding surface for the movement of cargo, such as pallets for air cargo, in and out of the carrier 40. The strips 12 can be made of high density polyethylene ("HDPE") or other materials having suitable low friction characteristics to provide the easy sliding surface.

Figure 4:
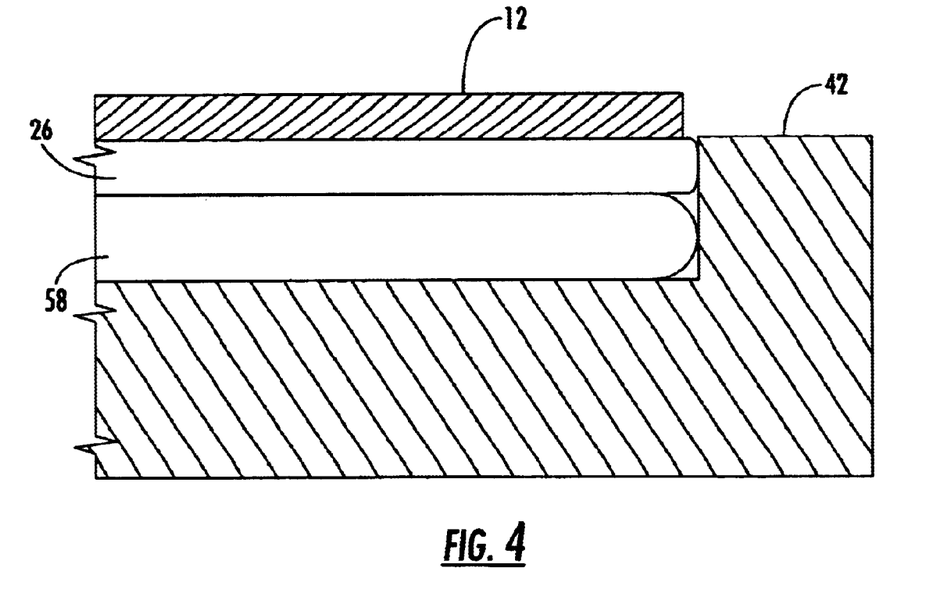
FIG. 4 is a partial section view of the adjustable system of FIG. 1 as seen along line 4—4 of FIG. 3 and shown with the adjustable strips in the operative position.
Figure 5:
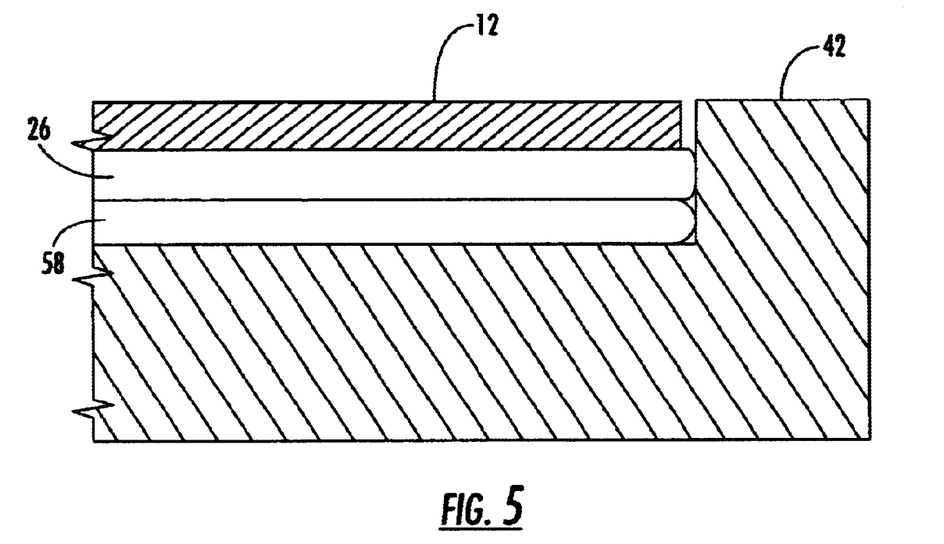
FIG. 5 is a partial section view of the adjustable system of FIG. 1 shown with the adjustable strips in the non-operative position.
Figure 6:
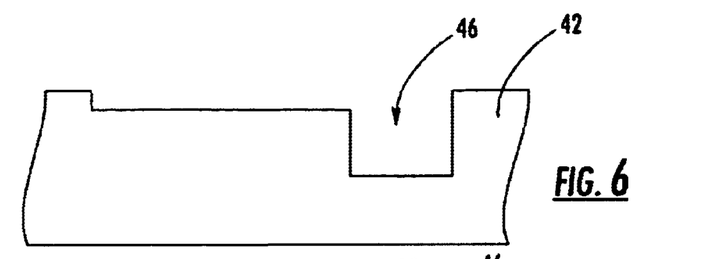
FIG. 6 is a partial section view of an adjustable system for handling cargo according to one embodiment of the invention, shown without the strips installed.

Preferably, the strips 12 extend longitudinally on the floor 42 of the cargo carrier 40 in a direction extending from a loading or access aperture such as a cargo door 44. Any number of strips 12 can be provided. As shown in FIGS. 1 and 3, in one embodiment, about five of the strips 12 can be provided along the width of the floor 42, but a greater or fewer number of strips can be used, for example, between about 2 and 8. Each strip 12 can extend the entire length of the cargo carrier 40 or multiple shorter strips can be provided collinearly. The strips 12 can be secured to the cargo carrier 40 by conventional connection devices, such as screws, bolts, latches, rivets, pins, adhesives, and the like. Preferably, the strips 12 are adjustably engaged to the floor 42 of the cargo carrier 40 such that the strips 12 can be selectively rotated, slid, or otherwise adjusted between an operative position for use and a non-operative position for non-use or storage, as further described below. In the operative position, each strip 12 extends from the floor 42 of the cargo carrier 40, as illustrated in FIG. 4, so that cargo placed in the carrier 40 is supported solely by the strips 12. In the non-operative position, shown in FIG. 5, the strips 12 are adjusted from their extended position such that cargo placed in the carrier 40 is supported solely by the floor 42 of the carrier 40, for example, by retracting the strips 12 into the floor 42.

Figure 7:
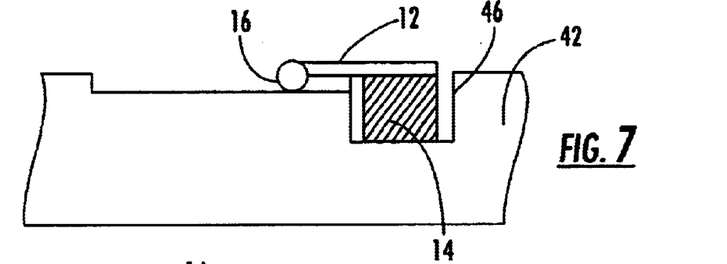
FIG. 7 is a partial section view of the adjustable system of FIG. 6 shown with the strips installed and adjusted to the non-operative position.
Figure 8:
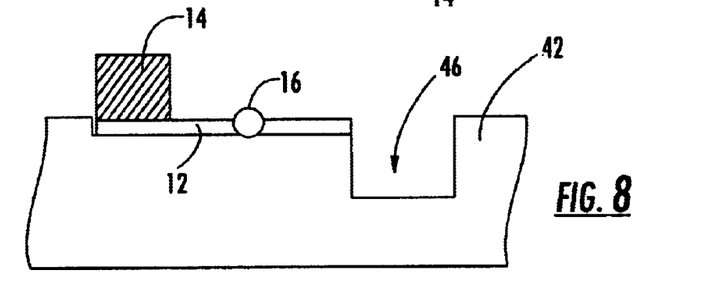
FIG. 8 is a partial section view of the floor of the cargo carrier of FIG. 6 shown with the strips installed and adjusted to the operative position.
Figure 9:
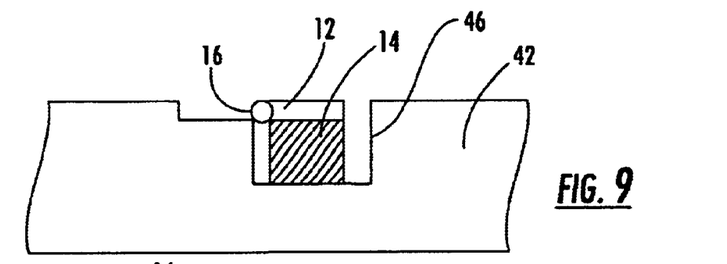
FIG. 9 is a partial section view of the adjustable system according to another embodiment of the invention, shown with the strips adjusted to the non-operative position.
Figure 10:
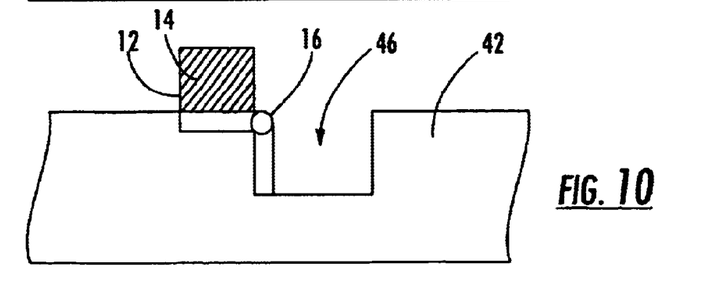
FIG. 10 is a partial section view of the adjustable system of FIG. 9 shown with the strips adjusted to the operative position.

In some embodiments of the invention, each strip 12 includes a portion 14 of low friction strip material such as HDPE that is mounted on a hinge 16 as illustrated in FIG. 69. Each hinge 16 is adjacent to a groove 46 formed in the floor 42 of the cargo carrier 40, and the hinges 16 rotatably connect the strips 12 to the floor 42. When the low friction strips 12 are needed for loading or unloading of cargo, the hinges 16 can be rotated to adjust the strips 12 to the operative position, i.e., flipped open to expose the strips 12 and raise them above the floor 42, as shown in FIGS. 8 and 10. When the strips 12 are not needed, such as when bulk cargo is being carried, the strips 12 can be adjusted to the non-operative position by rotating and closing the hinges 16, as shown in FIGS. 7 and 9. In the non-operative position, the strips 12 can be concealed within the grooves 46 of the floor 42. Thus, the strips 12 can be protected from dirty or rough conditions while in the non-operative position.

Figure 11:
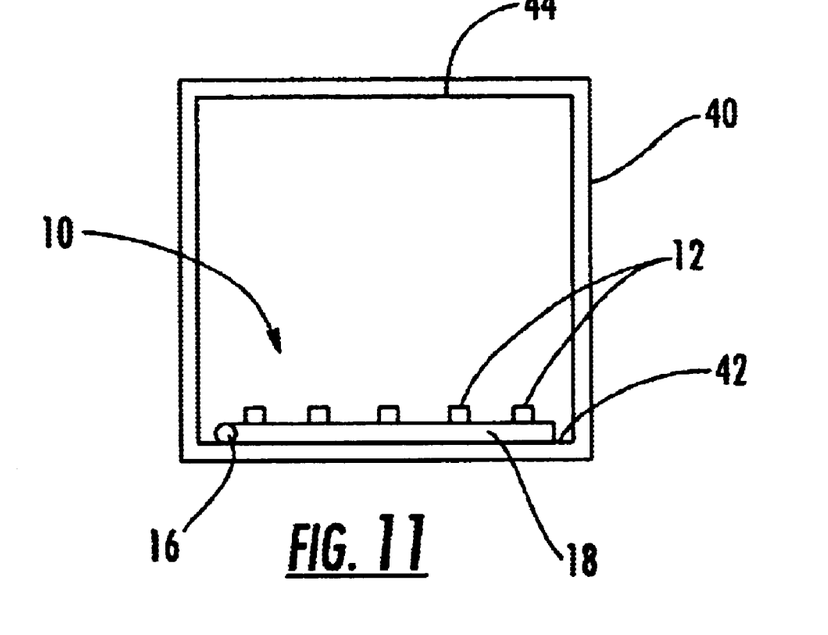
FIG. 11 is an elevation view of an adjustable system for handling cargo according to another embodiment of the present invention, shown in the operative position.
Figure 12:
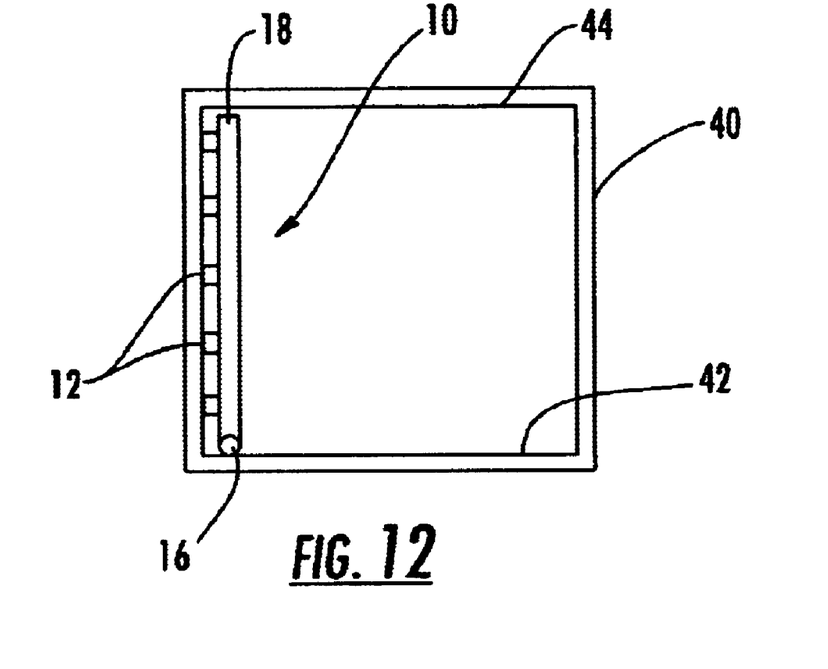
FIG. 12 is an elevation view of the adjustable system of FIG. 11 shown in the non-operative position.

Each of the strips 12 can be configured to be adjusted in unison between the operative and non-operative positions. For example, a mechanical linkage (not shown) can connect the strips 12 so that each strip 12 rotates about the associated hinge 16. In one embodiment of the invention, illustrated in FIGS. 11 and 12, all of the strips 12 are mounted on one or more frames 18 that are hinged along a bottom corner of the cargo floor 42 either at the side of the trailer, as shown, or at the front of the trailer or another location. Each strip 12 is rigidly connected to the frame 18 so that the frame 18 can be rotated to move the strips 12 to the non-operative position when not in use, for example, by rotating the frame about 90 degrees to a vertical position against a wall of the carrier 40. When the strips 12 are needed, the frame 18 can be moved downward to the operative position so that the strips 12 overlie the floor 42. Although only one frame 18 is shown in FIGS. 11 and 12, the invention can similarly include multiple frames that can be hinged to rotate, for example, about both bottom side corners of the cargo floor 42. Alternatively, the frame 18 may be removed from the trailer or cargo carrier 40 when the strips 12 are not needed.

Figure 13:
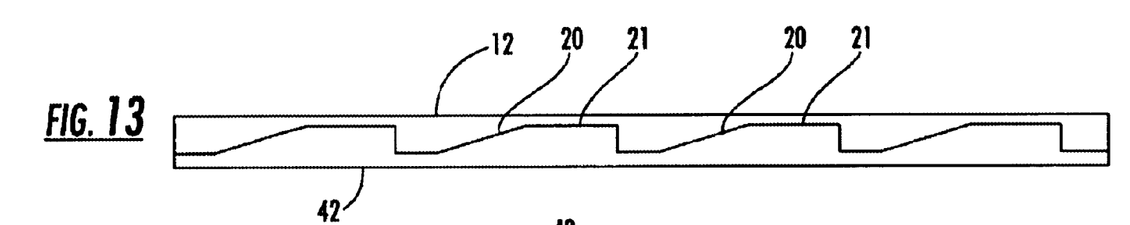
FIG. 13 is an elevation view of an adjustable system for handling cargo according to another embodiment of the present invention, shown in the non-operative position.
Figure 14:
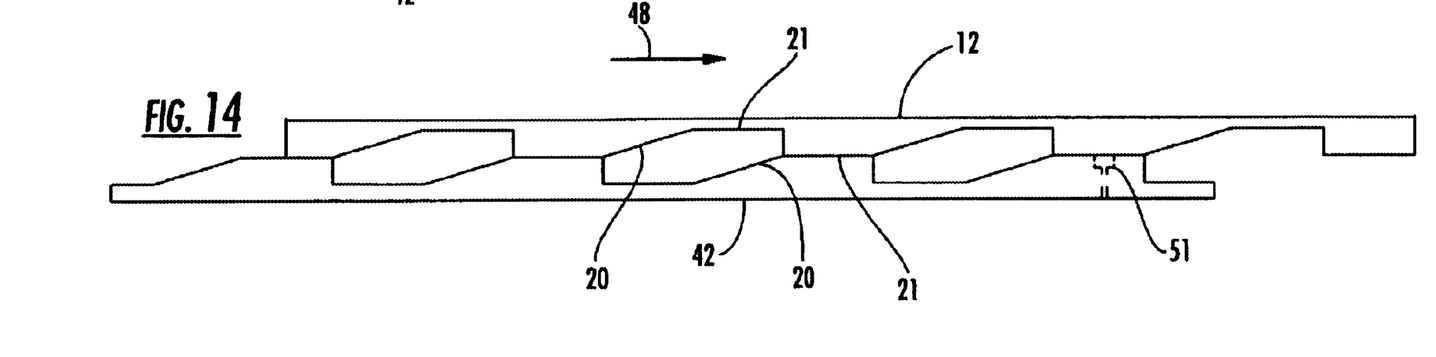
FIG. 14 is an elevation view of the adjustable system of FIG. 13 shown in the operative position.
Figure 15:
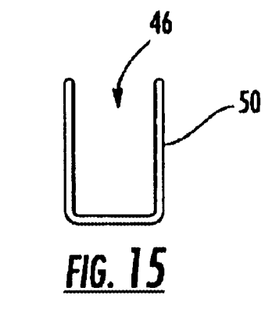
FIG. 15 is an elevation view of a channel defining a groove for receiving the strip of FIG. 13.

In another embodiment of the invention, illustrated in FIGS. 13 and 14, the strips 12 are slidably connected to the floor 42 of the cargo carrier 40 so that the strips 12 can be adjusted lengthwise, i.e., longitudinally, between the operative and non-operative positions. As shown, the bottom of each strip 12 and a portion of the floor 42 define one or more corresponding ramps 20. When the strips 12 are not needed, each strip 12 can be adjusted longitudinally to the non-operative position, illustrated in FIG. 13. As shown in FIG. 14, each strip 12 can be adjusted to the operative position by longitudinally sliding the strip 12 in a direction 48 so that the ramps 20 on the strip 12 and the floor 42 engage and the strip 12 is forced in a direction transverse to the plane of the floor 42, i.e., upwards in FIG. 14. Thus, the strips 12 can be adjusted longitudinally and the ramps 20 guide the strips 12 to the operative position. During adjustment to the non-operative position, gravity can be used to pull the strips 12 into the floor 42, or springs (not shown) or a manual force can be provided for that purpose. Preferably, the strips 12 in the operative position are raised above the floor 42 of the cargo carrier 40, and in the non-operative position are lowered to a position as low as or lower than the floor 42. The ramped portion of the floor 42 can be an integral part of the carrier 40 or can be attached to the floor 42 by fasteners, for example bolts that extend through holes 51 provided therefor. Each strip 12 and the associated portion of the floor 42 defining the ramps 20 can be contained in the grooves 46, which can be defined by a channel 50, as shown in FIG. 15. It is understood that the ramps 20 define the motion of the strips 12 between the operative and non-operative positions, and that the ramps 20 can be provided with various shapes that result in the desired operative and non-operative positions as well as a desired motion therebetween. For example, flat portions 21 can be provided between adjacent ramps 20 to support the strips 12 in the operative position.

Figure 19:
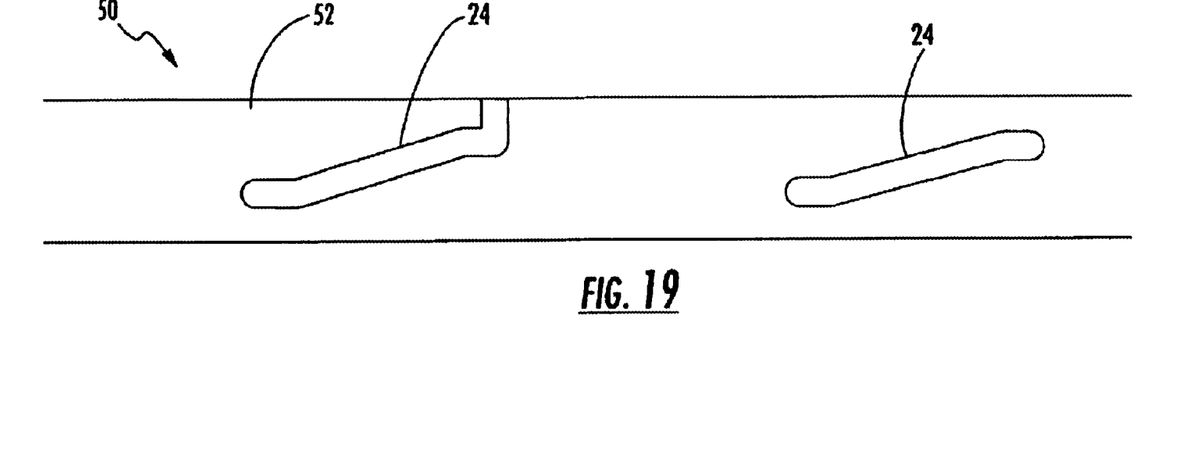
FIG. 19 is a section view of the channel of FIG. 16 as seen along line 19—19 of FIG. 18.

The strips 12 can also be slidably connected to the floor 42 by a plurality of protrusions 22 that engage corresponding notches 24. In one embodiment, shown in FIGS. 16–19, each strip includes protrusions 22 that extend in a direction generally parallel to the floor 42 of the cargo carrier 40. The protrusions 22 engage the notches 24, which are provided in the sidewalls 52 of the channel 50, bracket or other guiding portions of the floor 42. As shown in FIG. 19, the notches 24 are ramp shaped so that longitudinal adjustment of the strips 12 results in a corresponding transverse adjustment, i.e., raising or lowering of the strips 12. In this and other embodiments, the channels 50 can be an integral part of the floor 42, e.g., the grooves 46 formed therein, or the channels 50 can be formed separately from the floor 42 and attached thereto by fasteners 54, such as screws. Alternatively, the protrusions 22 can extend from the sidewalls 52, and the notches 24 can be provided on the strips 12.

Any of the embodiments described above may be accompanied by equipment for adjusting the strips 12 between the operative and non-operative positions, such as one or more electric, hydraulic, or pneumatic actuators. Additionally, the actuator(s) can simultaneously adjust the strips 12 to expose, cover, raise, or lower all of the strips 12 in unison. For example, when the strips 12 are secured to hinges 16, such as is described above in connection with FIGS. 6–10, a bar or other mechanical linkage system may be used to connect the strips 12 to flip them over simultaneously.

Figure 20:
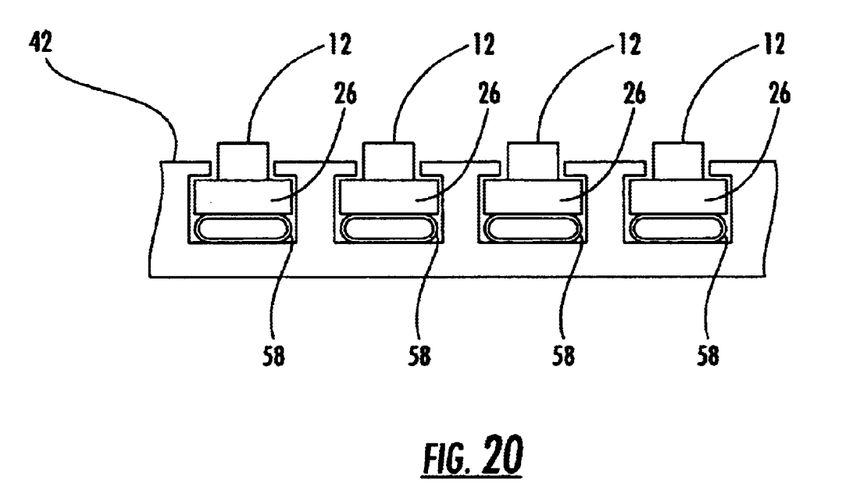
FIG. 20 is a partial section view of the adjustable system of FIG. 1 as seen along line 20—20 of FIG. 3.

In addition, the low-friction strips 12 may be selectively positioned by use of bladders or the like of the types conventionally used with roller systems as described above, and by other suitable means. In one embodiment, shown in FIGS. 4, 5, and 20, at least one bladder 58 is positioned beneath each strip 12 and configured to be inflated or deflated. For example, the cargo carrier 40 can include a source 56 of pressurized fluid such as air, as shown in FIG. 2, that is fluidly connected to the bladders 58. A valve (not shown) can be used to control the flow of fluid into and out of the bladders 58, thereby filling or emptying the bladders 58 and raising or lowering the strips 12. In the raised or operative position, shown in FIGS. 4 and 20, the strips 12 extend from the cargo floor 42. As the bladders 58 are deflated, the strips 12 are retracted into the cargo floor 42 to the non-operative position, shown in FIG. 5. Each strip 12 can include a structural support portion 26 disposed between the low friction portion 14 of the strip 12 and the bladder 58. The structural support portions 26 can be formed of a variety of materials including, for example, steel, aluminum, wood, and the like.

Other means for adjusting the strips 12 to and from the operative position are also envisioned. For example, the strips 12 can be adjusted by one or more mechanical ratcheting devices, hydraulic or pneumatic jacks, or electric solenoids.

Figure 16:
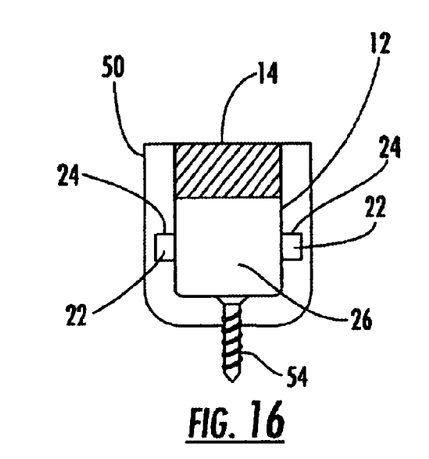
FIG. 16 is an elevation view of an adjustable system for handling cargo according to another embodiment of the present invention.
Figure 17:
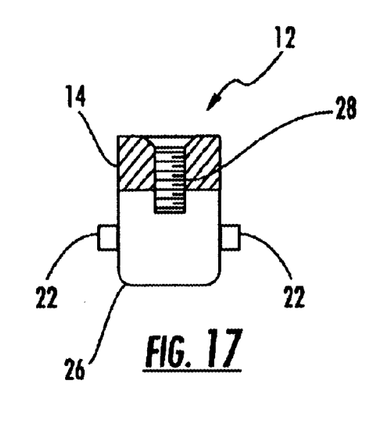
FIG. 17 is an elevation view of the strip of the adjustable system of FIG. 16.
Figure 18:
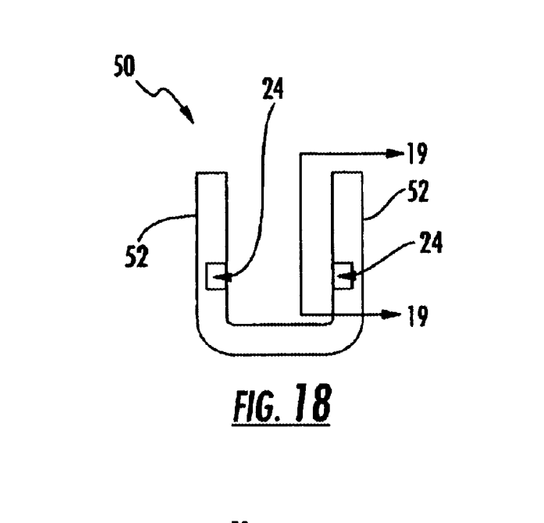
FIG. 18 is an elevation view of the channel of the adjustable system of FIG. 16.

Further, the low-friction strips 12 can be releasably connected on the mounting structures or floor 42 described herein so as to be replaceable, when, for example, the strips 12 become worn or scratched. Any suitable means may be used to mount the strips 12 onto the support structure, including screws, rivets or other fasteners, adhesives, or brackets engaging part or all of the periphery of the strip material. For example, as shown in FIGS. 16 and 17, the low friction portion 14 of the strip 12 can be attached to the structural support portion 26 of the strip 12 by screws 28. Thus, if the strips 12 become worn or damaged, the screws 28 can be removed and the low friction portions 14 of the strips 12 can be replaced.

In addition to vehicle trailers, the strips 12 and support structures described herein may also be used and/or mounted in conjunction with any floor or structures for handling cargo, including but not limited to aircraft, ships, warehouses, storage buildings, and shipping containers.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the invention. Although specific terms are employed herein, they are used in a generic and descriptive sense only and not for purposes of limitation.

That which is claimed:

1. An adjustable system for handling cargo in a cargo carrier, the system comprising:

a plurality of strips of low friction material for supporting cargo during unloading or loading, said strips having a relatively lower coefficient of friction than a floor of the cargo carrier, wherein each strip is adjustable between an operative position and a non-operative position, said strips in the operative position extending from the floor of the cargo carrier such that the cargo can be slid upon and supported by said strips, and said strips in the non-operative position being adjusted relative to the floor such that cargo in the carrier is at least partially supported by the floor.

2. An adjustable system for handling cargo according to claim 1, wherein said strips extend longitudinally in the carrier from a loading aperture of the carrier.

3. An adjustable system for handling cargo according to claim 1, wherein said strips are rotatably adjustable between the operative and non-operative positions.

4. An adjustable system for handling cargo according to claim 3, further comprising a hinge and a groove parallel to said hinge, said hinge rotatably supporting said strip such that each strip in the operative position extends upward from the floor of the carrier and each strip in the non-operative position is disposed in the respective groove.

5. An adjustable system for handling cargo according to claim 4, further comprising a linkage connecting said strips such that said strips rotate in unison between the operative and non-operative positions.

6. An adjustable system for handling cargo according to claim 3, further comprising a frame connecting said strips and said hinge for rotatably supporting said frame such that said strips in the operative position extend upward from the floor of the carrier and said strips in the non-operative position are rotated about an axis of said hinge approximately 90 degrees relative to the operative position.

7. An adjustable system for handling cargo according to claim 1, wherein the floor of the carrier defines a plurality of grooves for receiving said strips, each strip being slidably adjustable relative to the floor such that said strips in the operative position extend above the floor of the carrier and said strips in the non-operative position are retracted into the grooves of the floor.

8. An adjustable system for handling cargo according to claim 7, further comprising a linkage connecting hinges such that said strips slide in unison between the operative and non-operative positions.

9. An adjustable system for handling cargo according to claim 7, wherein each strip is slidably supported by the grooves of the floor such that each strip can be slidably adjusted in a longitudinal direction of said strips and thereby adjusted in a transverse direction perpendicular to the floor of the carrier between the operative and non-operative positions.

10. An adjustable system for handling cargo according to claim 7, wherein at least one of each strip and the respective groove define a guide defining the range of motion of said strip, said guide including at least one ramped portion and at least one flat portion.

11. An adjustable system for handling cargo according to claim 7, wherein each strip defines a plurality of ramped surfaces that engage correspondingly ramped surfaces of the floor of the carrier.

12. An adjustable system for handling cargo according to claim 7, wherein each strip slidably engages sidewalls of the respective groove by protrusions extending from at least one of the strip and the sidewalls, said protrusions received by notches disposed in the other of the strip and the sidewalls, said notches defining a ramped shape such that longitudinal adjustment of said strip correspondingly extends and retracts said strip relative to the floor of the carrier.

13. An adjustable system for handling cargo according to claim 1, further comprising a plurality of bladders, wherein each strip is disposed in a groove defined by the floor of the carrier and said bladders are disposed under said strips and configured to be inflated and deflated with a fluid such that inflating said bladders extends said strips from the grooves and to the operative position and deflating said bladders retracts said strips into the grooves and to the non-operative position.

14. An adjustable system for handling cargo according to claim 1, wherein each strip comprises a replaceable low friction portion releasably connected to a structural portion of the strip.

15. An adjustable system for handling cargo in a vehicle cargo trailer, the system comprising:

a cargo floor defining a plurality of longitudinal grooves extending from a cargo door;

a plurality of strips of low friction material for supporting the cargo during unloading or loading and during transit, said strips having a relatively lower coefficient of friction than said cargo floor;

a plurality of hinges parallel to said grooves, said hinges rotatably connecting said strips to said cargo floor such that each strip is rotatably adjustable between an operative position and a non-operative position, said strips in the operative position extending upward from said cargo floor such that the cargo can be slid upon and supported by said strips, and said strips in the non-operative position being disposed in the respective groove such that cargo in the carrier is at least partially supported by said cargo floor.

16. An adjustable system for handling cargo according to claim 15, further comprising a linkage connecting said strips such that said strips rotate in unison between the operative and non-operative positions.

17. An adjustable system for handling cargo in a vehicle cargo trailer, the system comprising:

a cargo floor defining a plurality of longitudinal grooves extending from a cargo door; and a plurality of strips of low friction material for supporting the cargo during unloading or loading and during transit, said strips having a relatively lower coefficient of friction than said cargo floor, said strips positioned in said grooves, each strip being longitudinally slidably adjustable between an operative position and a non-operative position, said strips in the operative position extending upward from said cargo floor such that the cargo can be slid upon and supported by said strips, and said strips in the non-operative position being retracted in the respective groove such that cargo in the carrier is at least partially supported by said cargo floor.

18. An adjustable system for handling cargo according to claim 17, further comprising a linkage connecting said strips such that said strips slide in unison between the operative and non-operative positions.

19. An adjustable system for handling cargo according to claim 17, wherein at least one of each strip and the respective groove define a guide defining the range of motion of said strip, said guide including at least one ramped portion and at least one flat portion.

20. An adjustable system for handling cargo according to claim 17, wherein each strip defines a plurality of ramped surfaces that engage correspondingly ramped surfaces of said cargo floor.

21. An adjustable system for handling cargo according to claim 17, wherein each strip slidably engages sidewalls of the respective groove by protrusions extending from at least one of the strip and the sidewalls, said protrusions received by notches disposed in the other of the strip and the sidewalls, said notches defining a ramped shape such that longitudinal adjustment of said strip correspondingly extends and retracts said strip relative to said cargo floor.

22. A method of handling cargo in a cargo carrier, the method comprising:

providing a plurality of strips of low friction material for supporting the cargo during unloading or loading, the strips having a relatively lower coefficient of friction than a floor of the cargo carrier; and selectively adjusting the strips between an operative position and a non-operative position, the strips in the operative position extending from the floor of the cargo carrier such that the cargo can be slid upon and supported by the strips, and the strips in the non-operative position being adjusted relative to the floor such that cargo in the carrier is at least partially supported by the floor.

23. A method of handling cargo according to claim 22, wherein said adjusting step comprises rotating the strips between the operative and non-operative positions.

24. A method of handling cargo according to claim 22, wherein said adjusting step comprises adjusting a linkage connecting the plurality of strips and thereby adjusting the strips in unison.

25. A method of handling cargo according to claim 23, wherein said rotating step comprises rotating each strip at least about 180 degrees about an axis parallel to the floor such that the strip in the operative position extends upward from the floor of the carrier and in the non-operative position is disposed in a groove defined by the floor.

26. A method of handling cargo according to claim 23, wherein said rotating step comprises rotating a frame connecting the strips about 90 degrees about an axis parallel to the floor such that the frame in the operative position extends parallel to the floor of the carrier and in the non-operative position extends generally perpendicular to the floor.

27. A method of handling cargo according to claim 22, wherein said adjusting step comprises sliding the strips relative to the floor in a longitudinal direction such that the strips in the operative position extend above the floor and the strips in the non-operative position are retracted into grooves defined by the floor.

28. A method of handling cargo according to claim 22, wherein said adjusting step comprises selectively inflating and deflating a plurality of bladders with fluid, the bladders being disposed in grooves and supporting the strips such that inflating the bladders extends the strips from the grooves and to the operative position and deflating the bladders retracts the strips into the grooves and to the non-operative position.

* * * * *